J. F. KELLER.
REPRODUCING MACHINE FOR MAKING AEROPLANE PROPELLERS AND THE LIKE.
APPLICATION FILED JAN. 11, 1918.
1,379,267.  Patented May 24, 1921.
8 SHEETS—SHEET 1.
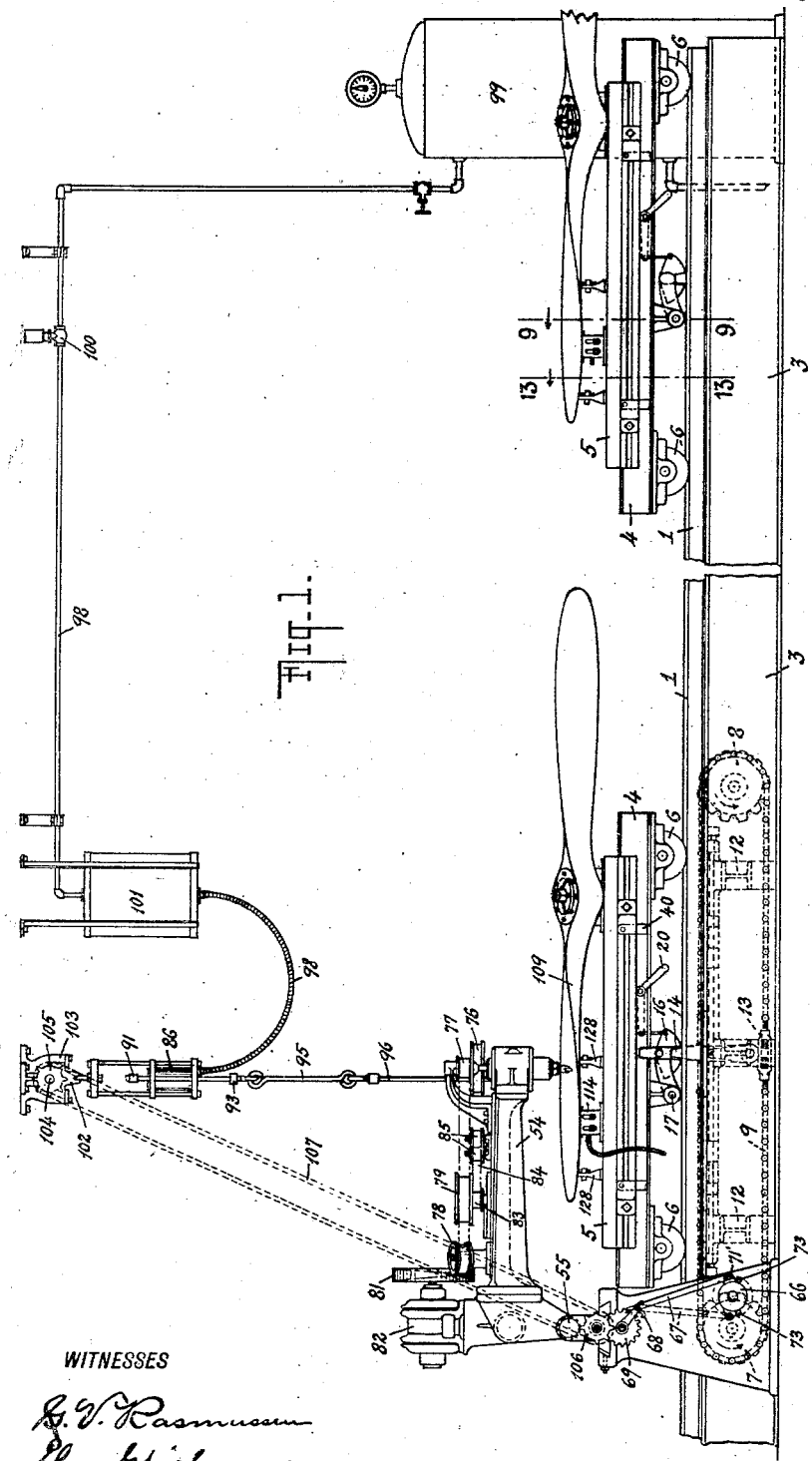

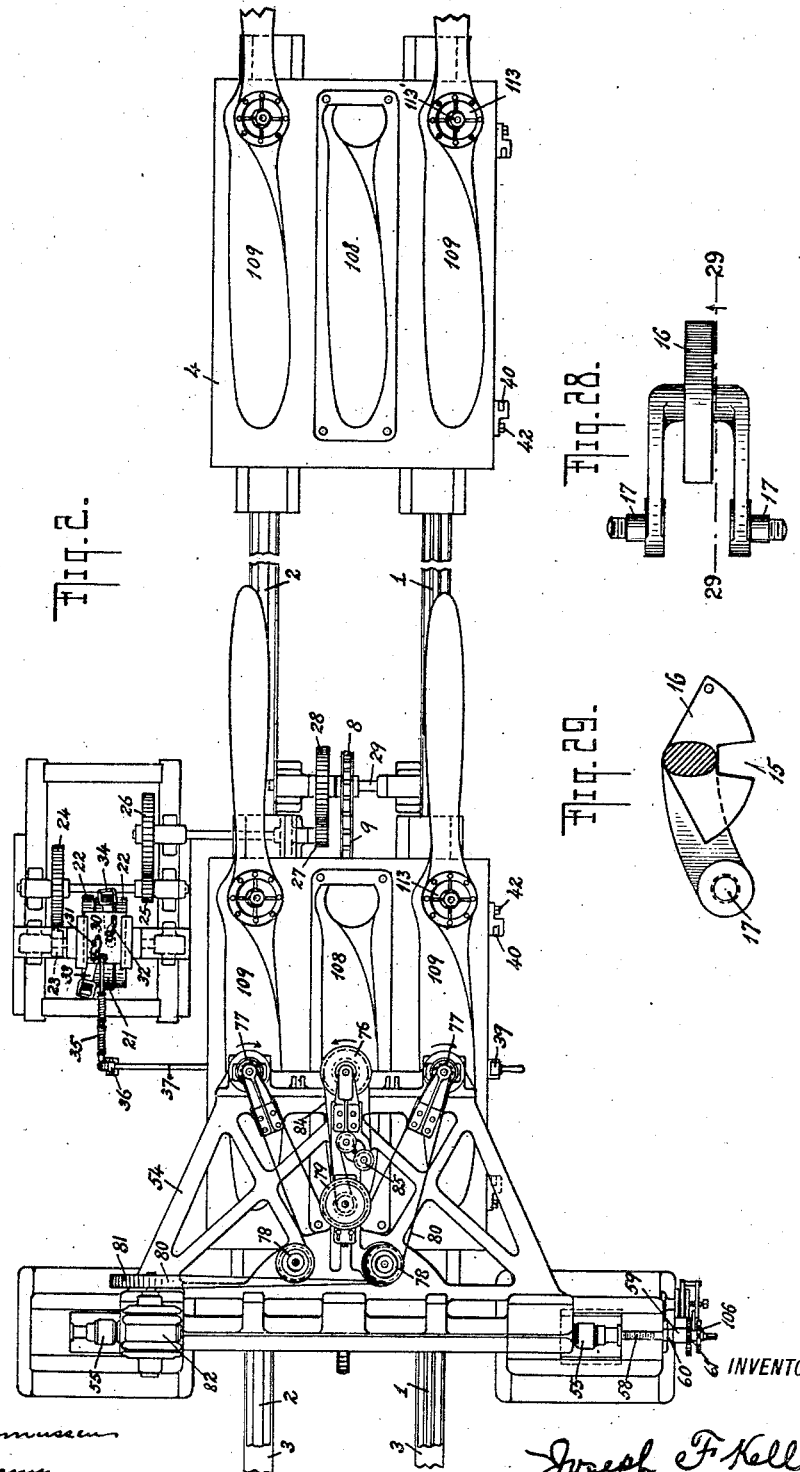

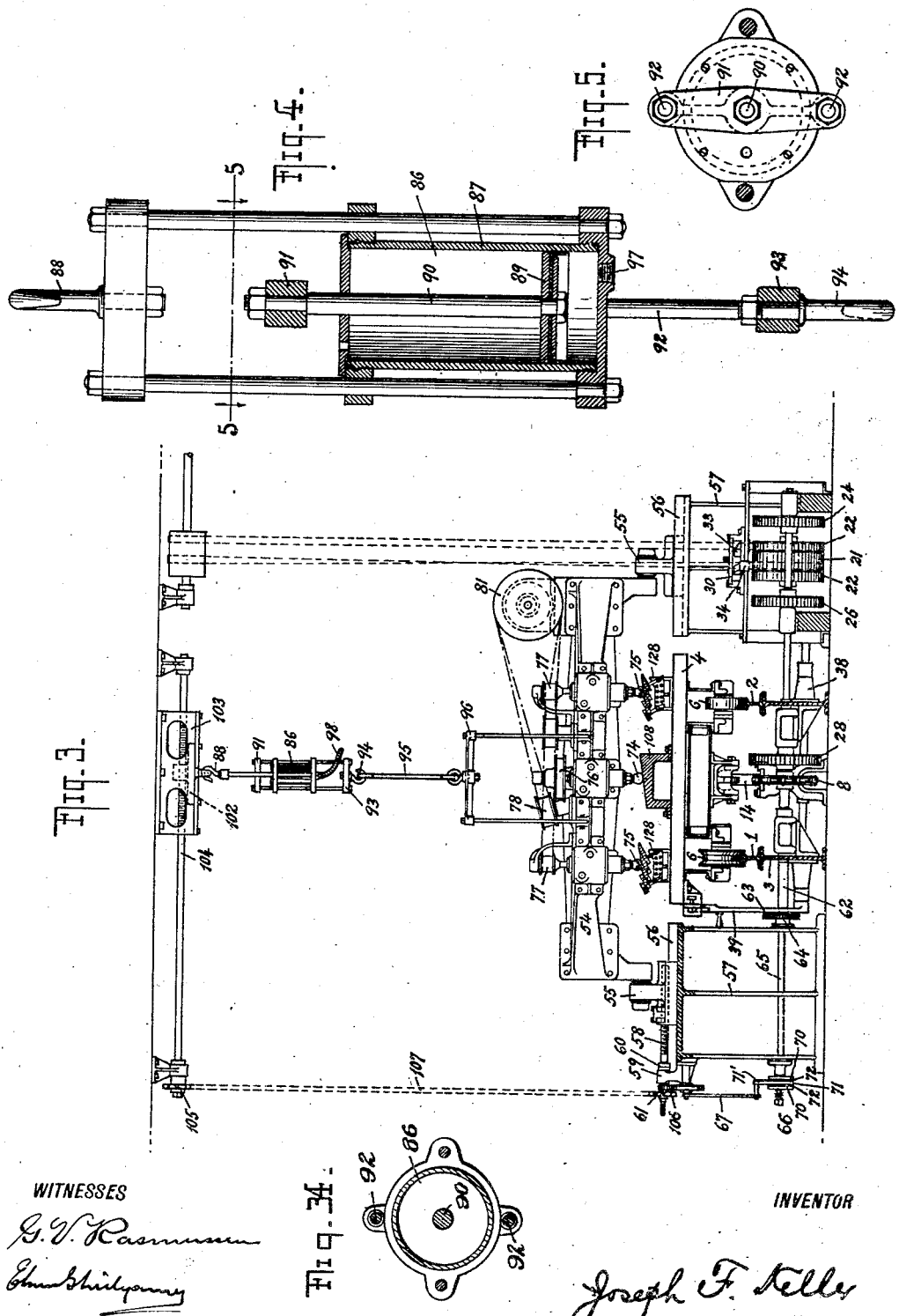

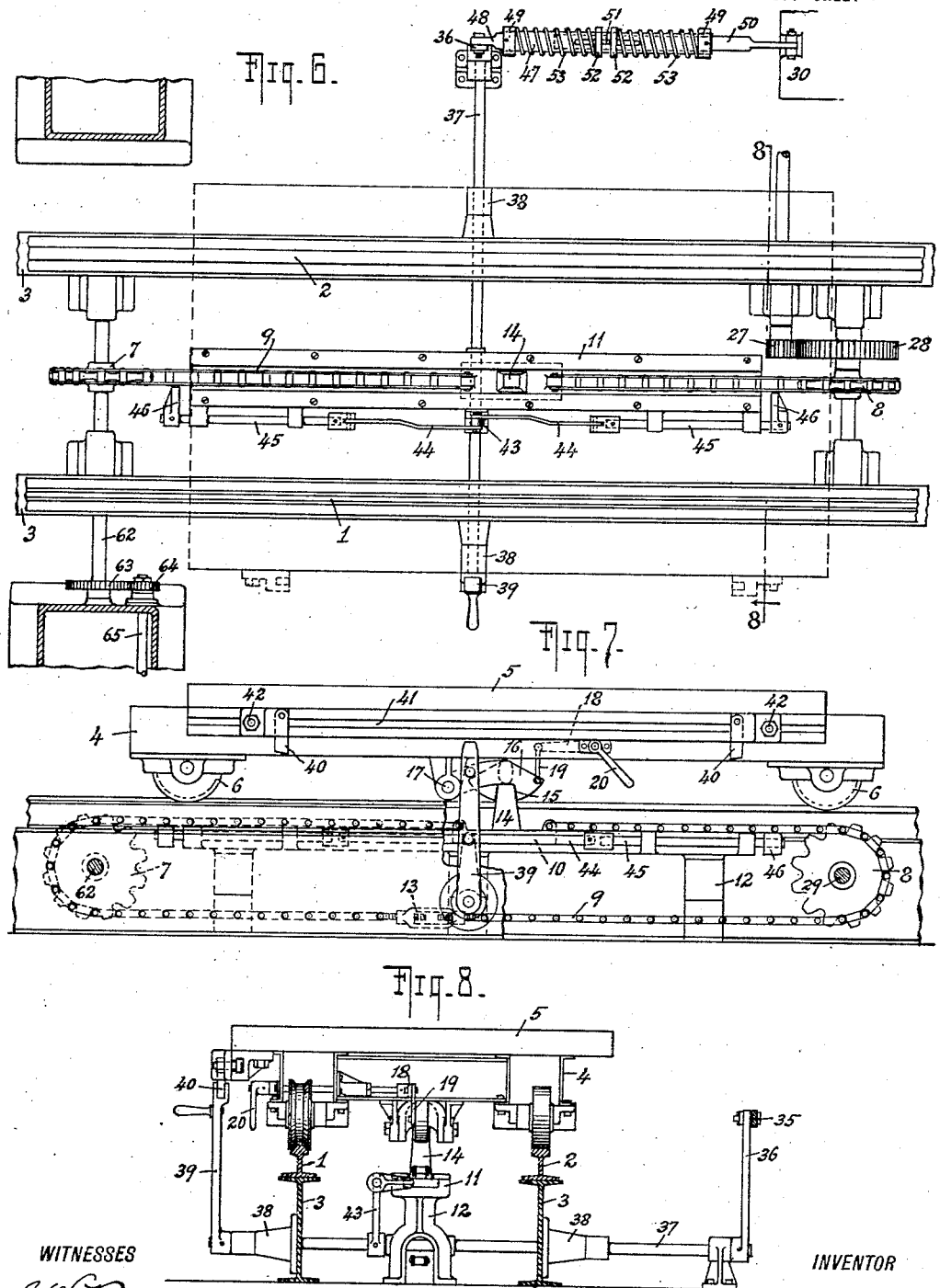

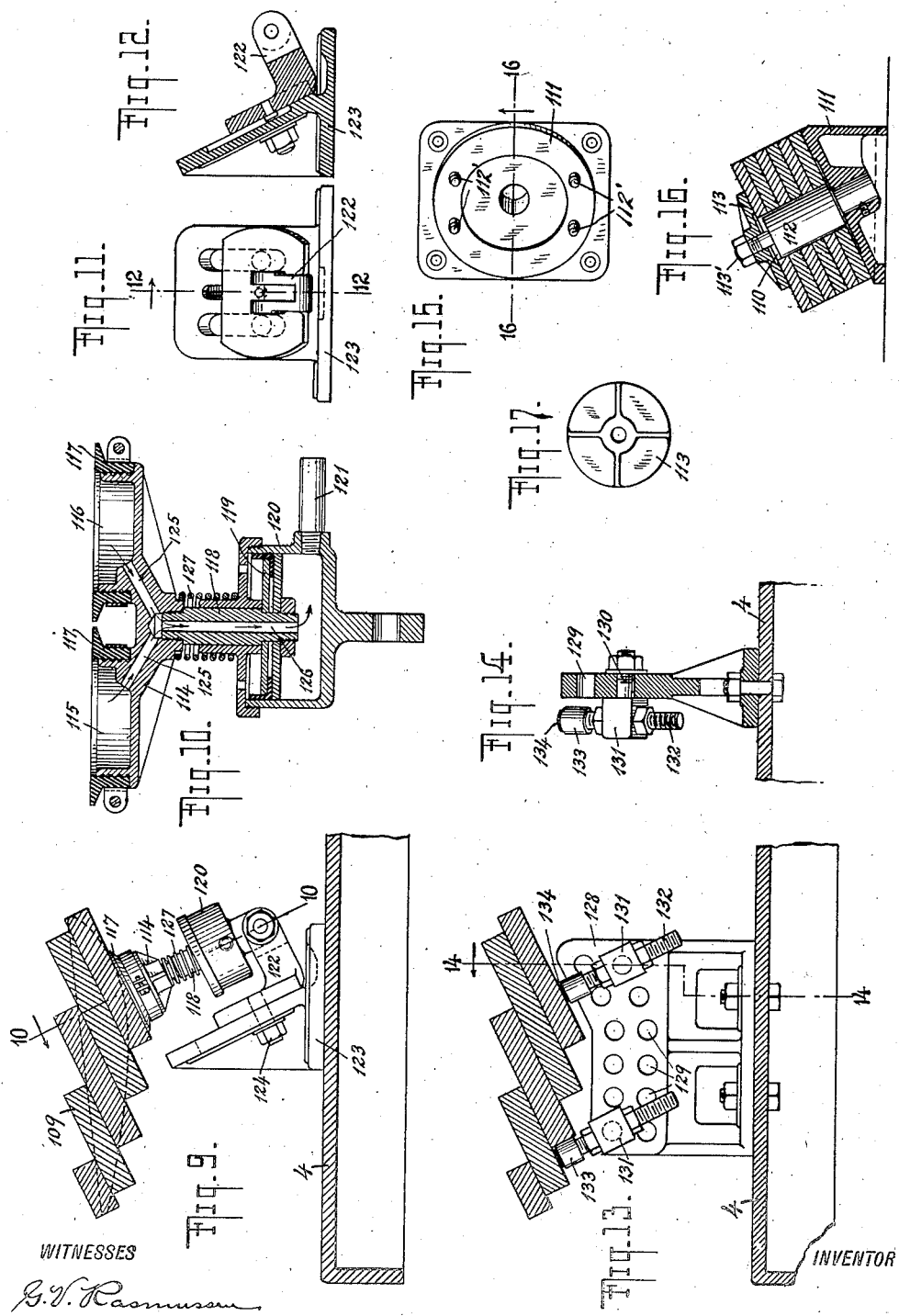

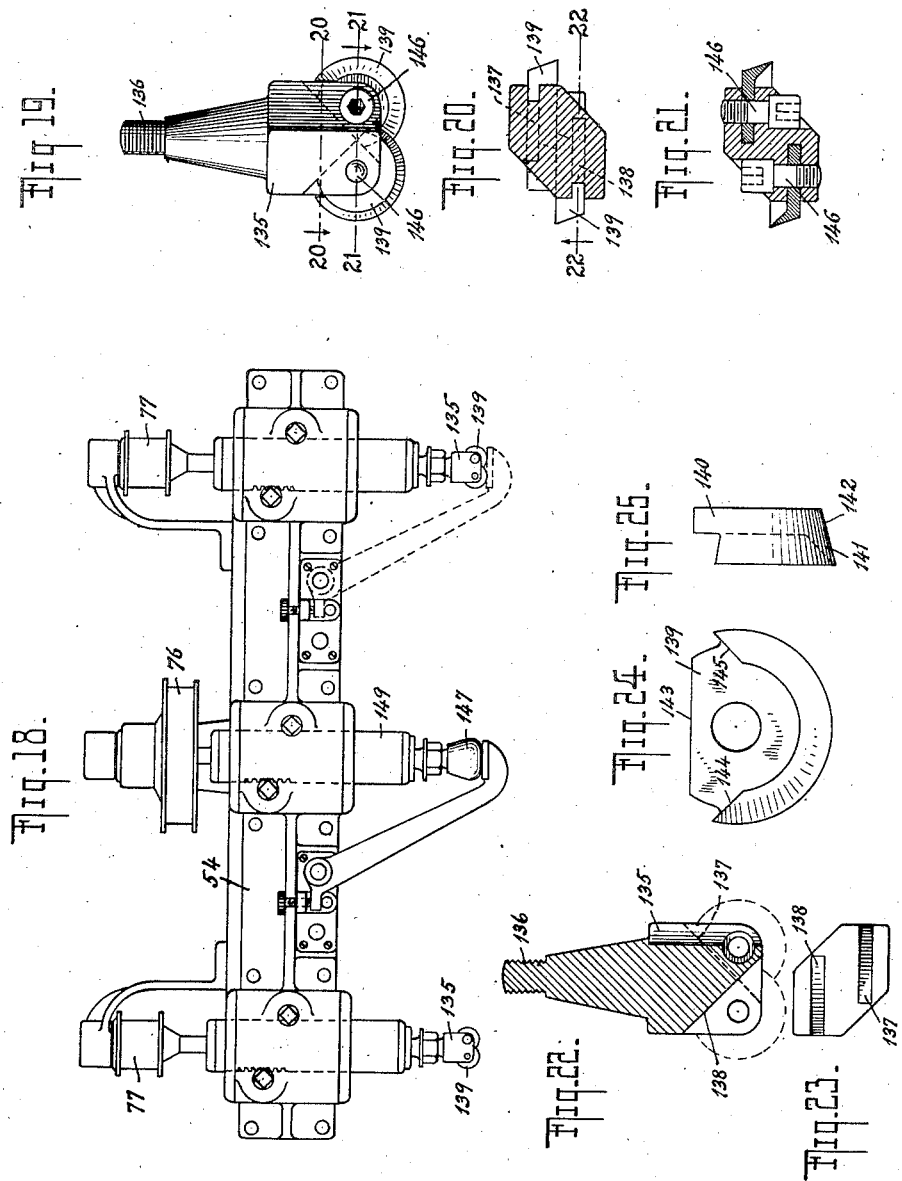

J. F. KELLER.
REPRODUCING MACHINE FOR MAKING AEROPLANE PROPELLERS AND THE LIKE.
APPLICATION FILED JAN. 11, 1918.
1,379,267. Patented May 24, 1921.
8 SHEETS—SHEET 7.
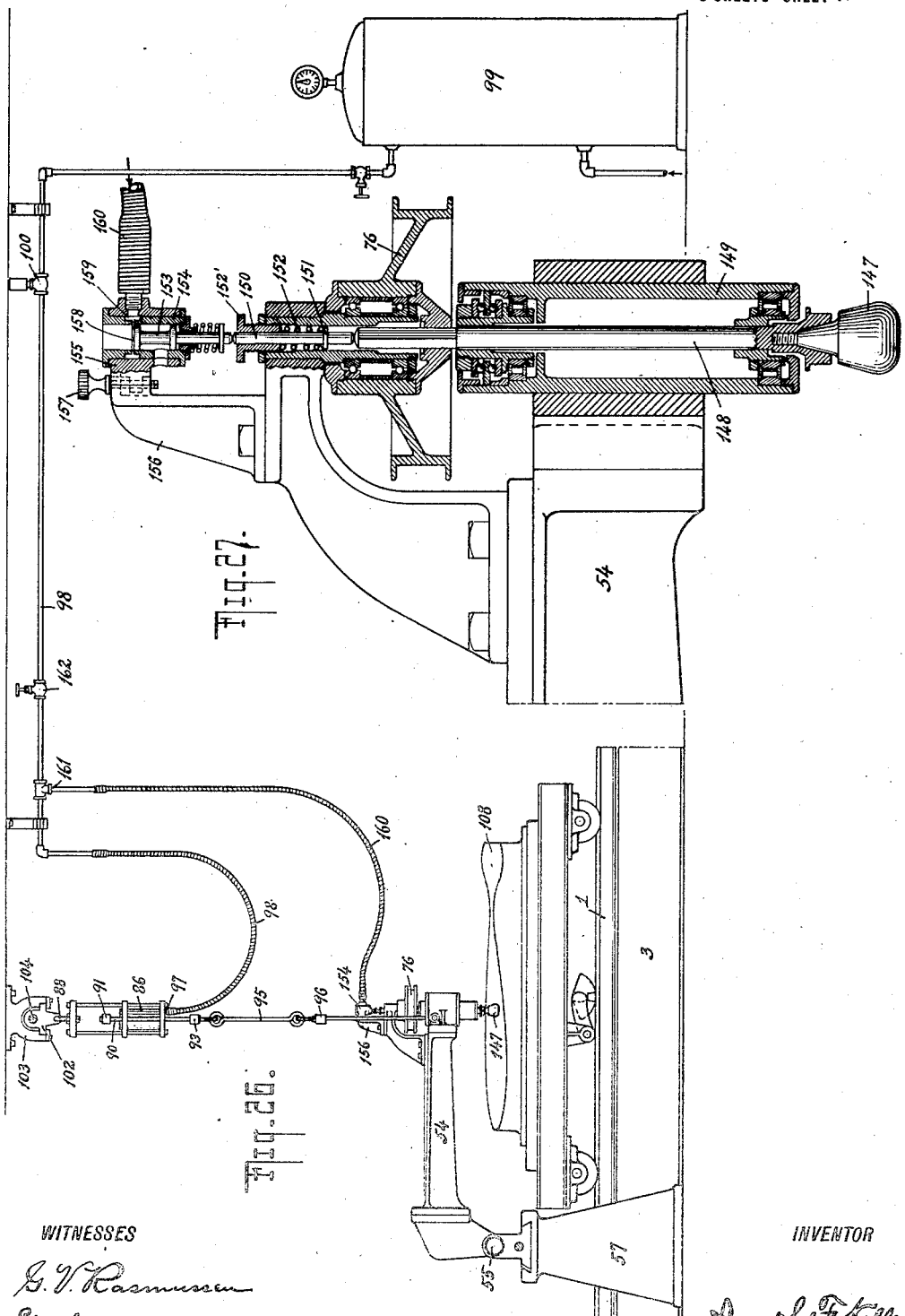
WITNESSES
INVENTOR

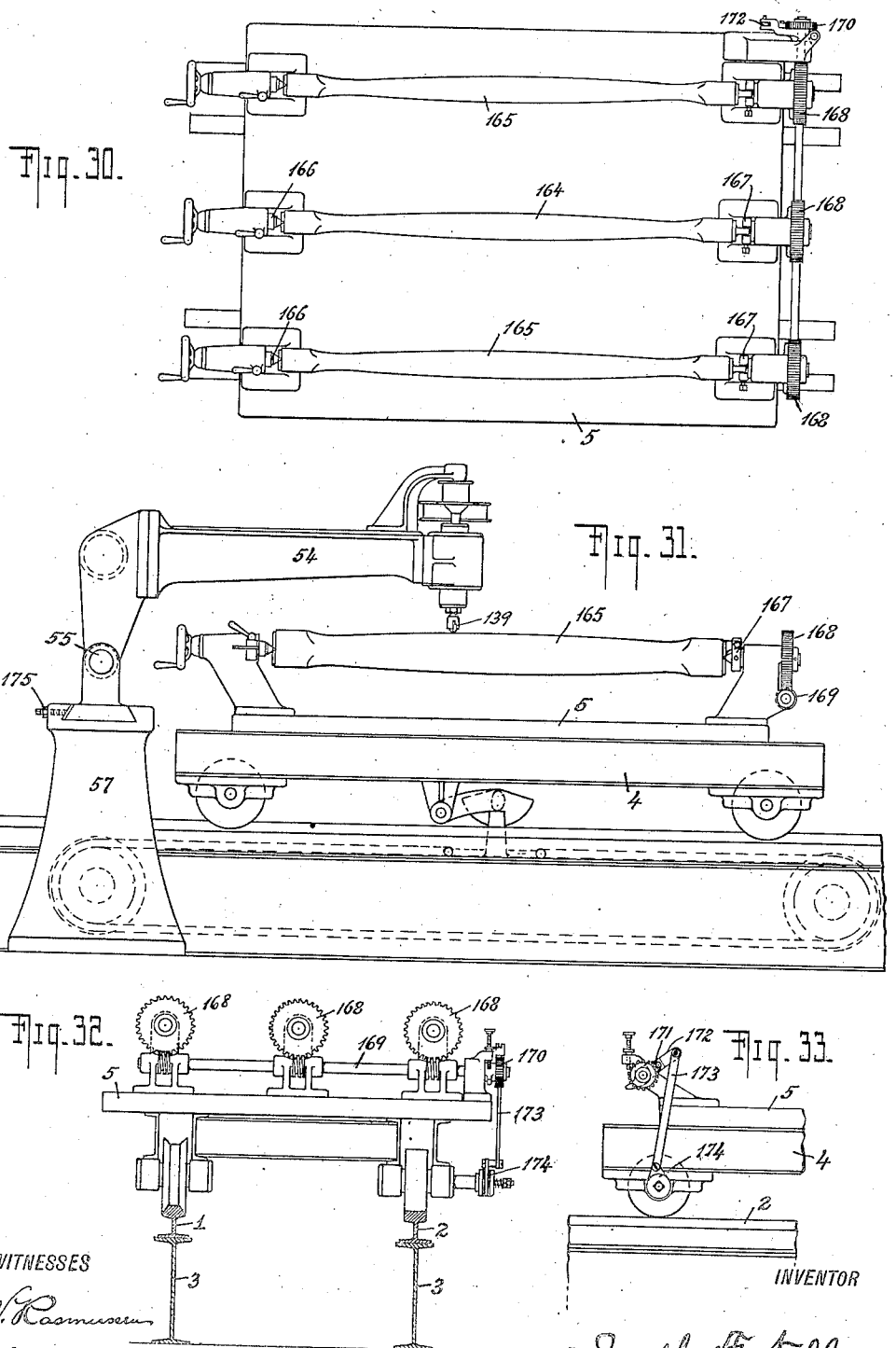

UNITED STATES PATENT OFFICE.

JOSEPH F. KELLER, OF NEW YORK, N. Y.

REPRODUCING-MACHINE FOR MAKING AEROPLANE-PROPELLERS AND THE LIKE.

1,379,267.　　　　Specification of Letters Patent.　　Patented May 24, 1921.

Application filed January 11, 1918. Serial No. 211,368.

*To all whom it may concern:*

Be it known that I, JOSEPH F. KELLER, a citizen of the United States, and a resident of the city, county, and State of New York, have invented certain new and useful Improvements in a Reproducing-Machine for Making Aeroplane-Propellers and the like, of which the following is a specification.

My invention relates to machines for reproducing from a templet, model or pattern to the same scale of dimensions, although some of the features of the invention are not necessarily confined thereto.

More particularly, my invention relates to certain improvements in a machine of the general type described and shown in the patent granted upon the joint application of William A. Warman and myself, under date of May 3, 1910, No. 956,769.

In the patented machine referred to, the work to be operated upon, as also the pattern, is attached to a support which is transversely movable, either manually or automatically, with respect to a longitudinally movable frame which carries a rotating cutter and tracer, tracer and cutter being themselves movable as one, in or with the frame, normal to the face of work and pattern. Either the work and pattern support or the tracer and cutter frame is alternately reciprocated in its line of motion while the remaining movable element is intermittently but unidirectionally fed in its line of motion. The result of these two movements is to cause every part of the pattern to be systematically traced over while the cutter correspondingly travels over every part of the work and reproduces it, to the same scale of dimensions, in exact accord with the pattern.

The object of my present invention is to provide a machine of the general type specified which shall be specially adapted to the economical and quick production of exceptionally large pieces of work which require to be made in large quantities. In the particular embodiment of the invention about to be described, I have shown a form of machine which is thus particularly adapted to the manufacture of propellers, usually of wood, such as are used on aeroplanes, dirigible balloons, and the like. And, in a modified embodiment, I have shown a form of the invention especially suited to the manufacture of struts such as are used in aeroplanes and to the manufacture of members of similar general characteristics.

My invention not only includes a special construction and arrangement of the tracer and cutter frame and of the work and pattern support, but also includes a special balancing arrangement for taking up part of the weight or pressure of the tracer and cutter frame upon the work and pattern, said balancing arrangement being automatically controlled by the pressure upon the tracer so as to eliminate, to a great extent, the inertia effect of the frame.

The invention also includes special pneumatic means for quickly fixing the work in place and holding it rigidly during the operation of the machine.

Still further, the invention includes a new and novel cutter which can be quickly and easily made and repaired at comparatively small cost and which is moreover, capable of removing stock at a very high rate of speed.

My invention will be better understood by referring to the accompanying drawings in which Figure 1 represents a front elevation of the center and right hand portion (the left hand portion being identical with the right), of a preferred form of machine, embodying my invention, for making aeroplane propellers; Fig. 2 is a plan of the view shown in Fig. 1; Fig. 3 is an end elevation, taken from the right of the view shown in Fig. 1; Fig. 4 is an enlarged elevation, part section, of the balancing cylinder which commonly supports part of the weight of the tracer and outer arm; Fig. 5 is a plan view taken along the line 5—5 of Fig. 4; Fig. 6 is a plan view, enlarged as 3 is to 2, with respect to Figs. 1, 2, and 3, showing the track and the work and pattern support or traveling table operating means, the shock absorbing link which controls the table reversing mechanism being unduly elongated for the purpose of bringing out the detail and the table itself being shown dotted; Fig. 7 is a front elevation of the view shown in Fig. 6, the table being here shown in full lines; Fig. 8 is a section, part elevation, taken along the line 8—8 of Fig. 6, the table being here also shown in full; Fig. 9 is a sectional elevation greatly enlarged, taken along the line 9—9 of Fig. 1, showing the pneumatic grip employed for holding fast the ends of the propeller blank as it is being worked upon; Fig. 10 is a section, twice enlarged, taken along the line 10—10 of Fig. 9; Fig. 11 is an elevation (parts being omitted) taken from the left of Fig. 9; and Fig. 12 is a section taken along the line 12—12 of Fig. 11; Fig. 13 is a section, taken along the line 13—13 of Fig. 1, showing the adjustable stops against which the propeller blank is held by the pneumatic grip; Fig. 14 is a section taken along the line 14—14 of Fig. 13; Fig. 15 is a plan view of the center against which the propeller blank is held during the time it is being worked upon; Fig. 16 is a transverse section taken along the line 16—16 of Fig. 15 when the propeller blank is clamped in position; Fig. 17 is a top plan view of the clamping plate shown in Fig. 16; Fig. 18 is an end elevation, considerably enlarged, of the outer end of the tracer and cutter frame as shown in Fig. 3; Fig. 19 is a side elevation of my improved cutter; Fig. 20 is a section taken along the line 20—20 of Fig. 19; Fig. 21 is a section taken along the line 21—21 of Fig. 19; Fig. 22 is a sectional elevation taken along the line 22—22 of Fig. 20; Fig. 23 is a plan view taken from the bottom of Fig. 22; Fig. 24 is a front elevation of one of the cutter elements on a scale twice that of Figs. 19 to 23; Fig. 25 is a side elevation of Fig. 24; Fig. 26 is a view, on the general lines of Fig. 1, but with some parts omitted and others added to illustrate the arrangement and operation of my improved automatic balance control device; and Fig. 27 is an axial section, greatly enlarged, taken through the tracer spindle and control valve actuated thereby; Fig. 28 is a top plan view, enlarged, of the pivoted latch which engages the work and pattern table; Fig. 29 is a section, taken along the line 29—29 of Fig. 28; Fig. 30 is a plan view of a work and pattern table to be used with a modified form of my invention; Fig. 31 is a side elevation of the table of Fig. 30 together with its track and the tracer and cutter frame as arranged to operate therewith; Fig. 32 is an end elevation taken from the right of Fig. 31; and Fig. 33 is a detail showing how the feed screw for rotating the work and pattern is actuated by the reversal of the table. Fig. 34 is a horizontal sectional view taken through the balancing cylinder.

Briefly set forth, the particular form of my improved machine herein illustrated and about to be described, comprises a horizontal track having a pair of rails upon which a work and pattern support, or table, having the form of a flat four-wheeled car, is adapted to travel back and forth. Upon this table is fastened a central pattern and, on each side thereof, a propeller blank to be worked out in the similitude of the pattern.

Lying above the central part of the track, and at a level higher than the table, is a tracer and cutter frame pivoted along one edge upon bearings arranged in transverse alinement at each side of the track. The other edge of this frame carries a central tracer and a pair of laterally disposed cutters, spaced apart in correspondence with the pattern and propeller blanks, said cutters being rotated at a suitable rate of speed by an electric motor carried upon the frame.

An endless driving chain, disposed between the tracks under the tracer and cutter frame, is adapted to be engaged by a latch carried upon the under side of the table. This chain is driven by sprockets from a gear which is automatically reversed by suitable reversing lugs attached to the table at each end, so that the table reciprocates continuously back and forth underneath the tracer and cutters.

The tracer and cutter frame is so carried in its bearings that, at each reversal of the table, the frame is fed transversely with respect to the table.

It follows, therefore, that, in the operation of the machine, successive strips of the pattern are passed under the tracer until the entire surface of the pattern has been gone over, and that the two propeller blanks will be correspondingly worked over by the cutters and shaped in the similitude of the pattern.

The track is made sufficiently long so that a second table may be at one end thereof, while the first table is traveling back and forth under the tracer and cutter frame as just described. This second table, having its own pattern, in the present case representing the other different side of the propeller, may have another pair of propeller blanks made ready thereupon while the first pair of propeller blanks is started on the first table. As soon as one side of the one half of the first pair of propeller blanks is finished, the latch engaging the driving chain is disengaged and the table carrying the finished work is pushed out toward the free end of the track and replaced by the second table which is then engaged with the chain so that its propeller blanks may now be shaped. While this is being done the propeller blanks of the first table may be reversed, end for end, so that, in due course, the first table may be run back so as to replace the second table, thereby enabling both ends of this side of the propeller blank to be shaped. This sequence of operations goes on continuously, the blanks being reversed, side for side, as soon as both ends of one side have been worked over, the completely finished propellers being removed from the table and replaced by new blanks at suitable times. In this way the machine may be kept in continuous operation without the loss of time which would otherwise be entailed in reversing the blanks or placing successive blanks upon the table.

In the drawings, the front track, 1, has a head whose section is shaped like a truncated wedge, while the head of the rear track, 2, is flat on top. These tracks are supported above the floor by I-beams, 3, which are themselves suitably attached to the floor and to one another by means not shown.

The work and pattern support or table, 4, comprises essentially, a flat plate, 5, having downwardly flanged edges and carried upon front and rear webs which are themselves provided with four wheels, 6, the two wheels resting upon the wedge-shaped track having a correspondingly tapered tread and the remaining wheels having flat treads. In this way any variations in the distance between, or lack of parallelism of, the tracks, has no effect upon the accurate running of the table, which is guided solely by the wedge-shaped track.

Disposed symmetrically on each side of the transverse center line of the tracks, and centrally of the I beams, is a pair of sprocket wheels, 7, 8, over which is passed, so as to be engaged thereby, a sprocket chain, 9, the ends of which are connected to the outer ends of a shoe, 10, linearly keyed and slidable in a guide, 11, carried upon supporting brackets, 12. A turnbuckle, 13, is inserted in the chain in the usual way for the purpose of taking up any slack.

Projecting upwardly from the center of the shoe is a lock member, 14, which, when the table, 4, is in operative position, as will later be described, is engaged by a notch, 15, formed in the bottom edge of a locking sector, or latch, 16, having laterally and longitudinally extended arms whose free ends are pivotally attached at 17 to brackets carried by the bottom of the table. By lifting the sector upwardly, the notch and lock member may be disengaged from one another and the table pushed from operative position toward and upon an outer free end of the track. This lifting of the sector may be manually accomplished by means of a lever, 18, connected by a link, 19, to the outer end of the sector and controlled by a handle, 20, all of which are attached to the table and move therewith.

Arranged at the rear of the track is a framework carrying a shaft having a central fixed pulley, 21, and lateral loose pulleys, 22, the face of the loose pulley having but half the width of the fixed pulley. This same shaft carries a spur gear, 23, (shown dotted, Fig. 2), which, by means of intermediate gears, 24, 25, 26, 27, and 28, drives the shaft, 29, upon which is fixed sprocket wheel 8.

A plate 30 is slidably mounted above the pulleys 21 and 22, so as to be movable in a direction transverse to the pulley shaft, and has two S-shaped cam slots 31, 32, formed therein so as to engage pins which are respectively fixed in belt-shifting levers, 33, 34, whose inner ends are pivoted, beneath the plate, to portions of the frame. The shaft and disposition of the cam slots is such that when the plate is moved to one extreme of its limit of travel, the belt-shifters, 33 and 34, will respectively move and retain the belts controlled by them upon the rear loose pulley and central fixed pulley; while, when the plate is moved to its other limit of travel, the same shifters will respectively move and retain the belts controlled by them upon the central fixed pulley and front loose pulley.

The movement of the plate is effected through a shock-absorbing link, 35, which extends between the plate, 30, and the upper end of an arm, 36, fixed to a shaft, 37, which extends through the I-beam, 3, to the front of the machine, and is adapted to have a limited angular movement in bearings, 38, supported upon said I-beams.

The outer end of shaft, 37, has fixed upon it a shift lever, 39, which extends upwardly with its free outer end lying closely adjacent to the front of table, 4, thus being adapted to be engaged by shifting lugs, 40, at each end of the table. These shifting lugs are linearly slidable in a guide, 41, attached to the front edge of the table and may be fastened in any determined position by the set screws, 42. As the table is moved in one direction or the other by means of the sprocket chain, 9, the shifting lugs, 40, will at the limit of the table's movement, engage the free end of arm, 39, and throw it in the one direction or the other, thus either pushing or pulling the shock-absorbing link, 35, and correspondingly moving the plate, 30, to the one limit of its path or the other, as the case may be. This will shift the belts upon the pulleys, 22, so that one or the other will engage the central fixed pulley. The sprocket chain, 9, and, hence, the table, will be therefore reversed.

Shaft, 37, also has fixed upon it, adjacent to the central bracket, 12, and in front of sprocket chain, 9, a short, upwardly extending shift arm, 43, to the free end of which are pivotally attached oppositely extending links, 44, which are themselves connected to shift rods, 45, slidably mounted in bearing lugs carried by the guide 11. The outer end of each shift rod carries a rearwardly projecting limit lug, 46. In case the driving mechanism should be started at any time when the table, 4, and sprocket chain, 9, are disengaged, and hence, when the shift lever, 39, cannot be engaged by the shifting lugs, 40, the ends of shoe, 10, will themselves engage the limit lugs, 46, and reverse the driving mechanism, thereby preventing continuous movement of the driving chain in one direction, and, hence, probable breakage due to the shoe or turnbuckle, 13, running upon the chain sprockets, 7, or 8.

Shock-absorbing link, 35, comprises an outer sleeve, 47, open at one end and having a lug, 48, at the other end by which it is connected to the arm, 36. Collars, 49, are fixed upon said sleeve at the ends thereof. An inner plug, 50, is slidably fitted within the sleeve, and has its outer end connected to the plate, 30. Plug, 50, has a central pin, 51, which projects through a linear slot formed in the outer sleeve. A pair of loose collars, 52, are provided, one on each side of pin, 51. Similiar coil springs, 53, abut respectively against the end collars, 49, and press the two loose collars against pin 51.

When, in the operation of the machine, arm, 36, is moved to either push or pull upon its end of the shock absorbing link, 35, the sleeve, 47, will tend, instantaneously, to move slidably with respect to the plug, 50, and plate 30. One of the coil springs, 53, will be compressed, therefore, while the other will expand. If the tension of the springs has been suitably chosen, however, they will immediately equalize, thereby moving pin, 51, plug, 50, and plate, 30, in the desired direction. Hence, although at the high speeds at which it is intended to run the machine, the shift lever, 39, or shift arm, 43, as the case may be, will be struck with great suddenness at the instant of reversal, the impulse actually received by the plate, 30, and by the belts which it controls, will be effectively cushioned.

The tracer and cutter frame, 54, is a suitably webbed skeleton casting, whose one edge is provided at its ends with journals which are carried in transversely alined bearings, 55; these bearings are transversely slidable in guides, 56, fixed upon the top of pedestals, 57, which are arranged respectively on the two sides of the track. The front bearing has a feed screw, 58, threaded therein, the outer end of this screw being smooth and supported by a bearing, 59, between collars, 60, and a spur gear 61, both of which are fixed upon the screw.

Shaft, 62, upon which is fixed sprocket wheel, 7, carries a spur gear, 63, meshed with a similar spur gear, 64, fixed upon a suitable shaft, 65, having at its outer end a ratchet actuating device, 66. This ratchet actuating device, 66, drives a link, 67, whose outer end operates a dog, 68, so as to angularly advance a gear, 69, which meshes with gear, 61, fixed upon the feed screw, as above described.

Ratchet actuating device, 66, comprises a pair of outer fixed disks, 70, separated from a central loose disk, 71, by felt disks, 72, all the disks being held together with moderate pressure. Disk 71, has a radial lug 71', to which is pivoted the lower end of link, 67.

Owing to the shorter length of the lever arm at which disk, 71, actuates link, 67, as compared with that of the radial arm which supports dog, 68, from the shaft of gear, 69, disk, 71, is able to rotate through 180° before link, 67, can cross the plane which includes shaft 65, and the shaft which carries gear 69. In operation, therefore, if shaft, 65 (and hence disk, 71), rotates counterclockwise (as seen in Fig. 1), dog, 68, will merely move clockwise through a certain angle and then return to its original position and remain there as long as shaft, 65, continues its clockwise motion, lug, 71', bringing up against one or the other of suitable stops, 73, which are provided for the purpose upon opposite sides of the actuating device. And when shaft, 65, reverses and rotates counterclockwise, it is clear that exactly the same thing happens, and that dog, 68, will again advance through the same angle as before and then return to its original position with lug, 71'', against the opposite stop, 73, and so on indefinitely.

Mounted in bearings arranged upon the shorter free edge of the tracer and cutter frame is a central rotating tracer, 74, and two outer rotating cutters, 75, the tracer being provided with a driving pulley, 76, and each cutter with a driving pulley, 77.

Fixed idler pulleys, 78, 78, and a slidable idler pulley, 79, are so disposed that a belt, 80, may be engaged with them and with the driving pulleys of both cutters, so as to be driven by a pulley, 81, fixed upon the shaft of a driving motor, 82, which is mounted upon the top of the tracer and cutter frame. By sliding pulley, 79, in the one direction or the other, the belt which drives the cutters may be kept suitably tight.

Fixed to the bottom of idler pulley, 79, is a smaller pulley, 83, which is connected with the tracer pulley, 76, by a belt, 84, so as to drive the tracer. Since the adjustment of slidable pulley, 79, in maintaining the tightness of belt, 80, would change the tension of belt, 84, this belt is caused to be engaged by a pair of small idler pulleys, 85, which are mounted upon the ends of a short bar centrally pivoted upon the tracer and cutter frame and held in frictional contact therewith.

Since the machine which is being described is necessarily of very considerable dimensions, owing to the large size of the propeller blades which are to be produced, it is obvious that the pressure upon the tracer and cutters due to the weight of the tracer and cutter arm, must also be very considerable. It is therefore desirable, if not necessary, to counterbalance, to a very considerable extent, this excessive weight. This is accomplished through a pneumatic counterbalancing device, including a balancing cylinder 86 (shown in section in Figs. 4 and 5), and in operative position in Figs. 1, 3 and 26).

Balancing cylinder, 86, comprises an air cylinder, 87, closed at the bottom and adapted to be hung vertically from a hook, 88, centered in a cross-head having laterally dependent rods between and to which the air cylinder is fixed. Slidable within the air cylinder, 87, is a piston, 89, having an upwardly extended piston rod, 90, passing easily through the cylinder cover and having its outer end centrally fixed in a cross-head, 91. Rods, 92, depend laterally from the ends of cross-head, 91, and are slidably guided in lugs attached to the air cylinder; they terminate in a bottom cross-head, 93, in which is fixed a central hook, 94. This hook, 94, through a link, 95, and an inverted U member, 96, the ends of whose legs are pivotally attached thereto, is connected with the tracer and cutter frame.

The bottom cylinder head is provided with an opening, 97, to which is connected the outer end of an air pressure line, 98, (Fig. 1) supplied from an air tank, 99, or other source of supply. A pressure reducing valve, 100, and equalizing reservoir, 101, are, preferably, interpolated in this air line.

Hook, 88, being suitably hung from above, it is obvious that with a suitable air pressure in tank, 99, and a suitable adjustment of pressure reducing valve, 100, the piston, 89, will be permanently supported upon a column of air within the air cylinder, 87, so as to carry any predetermined part of the weight of the tracer and cutter frame.

Since any angular advance of feed screw, 58, either clockwise or counter-clockwise, will necessarily cause the tracer and cutter frame to move transversely with respect to the line of the tracks, it follows that hook, 88, should move in correspondence with this movement of the tracer and cutter frame if the function of the balancing cylinder is to remain undisturbed. This is readily accomplished by hanging the hook, 88, from an overhead slide, 102, which is guided in a slideway, 103, and engaged by a feed screw, 104, alike with and lying in the same vertical plane with feed screw, 58. Corresponding ends of the two feed screws are provided with sprocket wheels, 105, 106, and connected together by a sprocket chain, 107. Feed screw, 104, therefore, moves in exact correspondence with feed screw, 58, and the balancing cylinder always maintains the same position with respect to the tracer and cutter frame.

Corresponding to the central tracer, 74, and to the pair of outer cutters, 75, the table, 4, carries a central pattern, 108, and a pair of outer blanks, 109, which are to be shaped into propellers. Since the two halves of a propeller are alike, the pattern need only represent half of a complete propeller; it may be fastened to the table in any preferred or usual way.

The propeller blanks, according to the present practice, are built up of strips of wood, preferably mahogany or walnut, of varying width; these strips are arranged in laminæ with the grain of the respective strips running so as to insure a minimum warping and twisting for the completed blank.

To hold the blanks upon the table I first provide them at the center with an accurately formed shaft hole or bearing, 110, and spaced bolt holes surrounding the shaft bearing. These holes will eventually be employed to attach the finished propeller to its shaft but are here used to seat the blank and hold it firmly upon a center or bracket, 111, removably fastened to the table, 4, at one end. This bracket has an inclined face and a center pin, 112, perpendicular thereto which pin engages bearing, 110, while a clamp plate, 113, slips over the outer end of the center pin and is pressed against the blank by a clamp nut, 113'. The dowel pins 112' are rigidly secured to the bracket 111 and engage the above-mentioned bolt holes, which are intended to be employed eventually in securing the propeller to its shaft.

As the propeller blank is relatively long and slender I find it necessary to support its end firmly so as to prevent any spring in a direction perpendicular to the table or any twist parallel to the table. To accomplish this I utilize what I have termed a pneumatic grip; this, in effect, is a suction device, attached to the table but movable thereupon from place to place.

This pneumatic grip comprises a head, 114, formed so as to provide a pair of coplanar cups, 115, 116; soft rubber rings, 117, are clamped about and project outwardly beyond the flanges which constitute the walls of the cups. The head is supported upon a piston rod, 118, having a piston, 119, of usual cup leather type, this piston being slidable in a cylinder or casing, 120, from the bottom of which, below the piston, is led an air pipe, 121, to a suitable air pump or other vacuum device. Casing, 120, is pivotally attached by a suitable lug to a bracket, 122, so as to swing thereupon in a vertical plane. This bracket is adjustable up or down upon the inclined face of a base, 123, the face lying in a plane perpendicular to the pivotal plane in which the casing swings and having a pair of slots which are adapted to be engaged by bolts fixed in the bracket and provided with nuts, 124, for fastening bracket and base rigidly together. The base, 123, is adapted to be moved about upon the table, 4, and to be attached thereto at any desired point and in any azimuth by bolts or other means usual in the art. For this purpose the table may be provided with parallel guide slots in the usual way.

Passages, 125, connect the two cups together and with a through passage, 126, provided centrally of the piston rod, 118. Suction produced in pipe 121 will, therefore, draw air into the cups and through the passages 125 and 126.

The inclined face of base, 123, is preferably such that its plane is perpendicular to the plane of the laminæ which make up the propeller blank; this, of course, will vary with propellers of different design.

In practice, after the propeller blanks have been fastened at their centers upon the brackets, 111, one or more pneumatic grips, as just described, is placed at a suitable point or points upon the table, 4, under the blank with the inclined face of base, 123, parallel with the length of the blank. By then raising or lowering bracket, 122, and swinging casing, 120, in or out as the case may be, the cups of the pneumatic grip may be brought into contact with a flat face of the propeller blank.

Normally, a spring, 127, keeps piston, 119, at the top of casing 120.

If, now suction be applied to pipe, 121, air will be exhausted from cups, 115, and 116, the propeller blank will be firmly pressed against the cups, and piston, 119, will be drawn toward the bottom of its casing, 120, pulling the ends of the propeller blank with it until head, 114, brings up against the central boss provided on the casing head.

In order that the propeller blank may be held in the exact position desired during the operation of my machine, I prefer to place fixed stops under the blank against which the same may be drawn by the pneumatic grip, in preference to attempting to position the grip itself with great accuracy and to permitting the head of the grip to be drawn down to its limit. For this purpose I provide a stop supporting bracket, 128, having a base adapted to be attached to the top of table, 4, in the same manner as has been described for the base, 123, of the pneumatic grip. The top of this supporting bracket is provided with a plurality of bores, 129, adapted to receive the shanks, 130, of stop blocks, 131, each of which has a stop screw, 132, threaded therethrough at right angles to the axis of the shank. One end of each stop screw carries a head 133 having a central soft rubber plug, 134.

When in use, a base, 128, is placed under the propeller blank near a pneumatic grip and the shanks at one or more stock blocks, 131, are engaged with selected bores, 129. The blocks are rotated about their axes and the stop screws, 132, are adjusted until the heads, 133, are so positioned that when the propeller blank is acted upon by the pneumatic grips the blank will be held firmly against the plugs, 134, in the desired position for working.

The operation of my invention is as follows:

The pattern and propeller blanks being in position, as shown in Figs. 1 to 3, power is turned on so as to drive the belts which pass through belt shifters, 33, 34, and start the motor, 82, which rotates the tracer and cutters. This will cause sprocket wheel, 8, to be driven clockwise, for example, thus moving table, 4, to the right and causing the pattern and propeller blanks to be moved under tracer and cutters respectively. The propeller blanks will now be cut along a definite longitudinal line in exact correspondence with a similar line of the pattern. When the table, 4, is moved so far to the right that the entire length of the pattern has been gone over by the tracer, the left hand shifting lug, 40, will engage shift lever, 39, and move it to the right, thus correspondingly moving arm, 36, to the right and moving through the shock absorbing link, 35, plate, 30, so as to shift the belts and thus reverse sprocket, 8, and table, 4.

Simultaneously with the reversal of sprocket, 8, and table, 4, ratchet actuating device, 66, will be operated from the shaft, 62, spur gears, 63, and 64, and shaft, 65, so as to advance feed screw, 58, through link 67, and gears, 69, and 61. This will cause the tracer and cutter frame to be moved transversely so that, during this reverse movement of table, 4, the tracer will move over an adjacent line of the pattern parallel to the first line while the cutters will move over a similarly related line on the propeller blanks. At the end of this reverse stroke or movement of the table the latter will again be reversed so as to move in its original direction to the right, by the engagement of the right hand shifting lug, 40, with the shift lever, 39. And, with each reversal of the table, the tracer and cutter frame will be moved transversely by the predetermined amount through the operation of ratchet actuating member, 66.

Feed screw, 104, moves in exact correspondence with feed screw, 58, by reason of the sprocket chain, 107, which connects them. Balancing cylinder, 86, is therefore moved simultaneously with and in exact correspondence with the tracer and cutter frame and hence always retains the same position relatively thereto.

In order to operate the machine at a high rate of speed and thus turn out the propeller blanks with great rapidity, I have found it necessary not only to run the cutters at high velocity, but also to provide a special form of cutter, 75. (See Figs. 18 to 25).

This cutter comprises a holder, 135, having its upper end threaded at, 136, so as to attach to the permanently mounted spindle upon the tracer and cutter frame. In making this holder, square stock is used and two narrow parallel slots, 137, 138, are formed in opposite faces at one end thereof. These slots are readily cut on the milling machine and the base of each slot placed at an angle of 45° with the axis of the holder. The slots are identical as to dimensions and their depth is so determined that, at the bottom of the holder, the slot covers about three-quarters of the original width of the stock.

In making the cutters proper, 139, I preferably take a steel disk whose thickness is just a little greater than half the distance between the outer walls of slots, 137, and 138, and whose diameter is a trifle less than the length of said slots at their base. I then turn down and turn out the disk on one side so as to provide a body, 140, whose thickness is that of the slots, 137, 138, having a peripheral outwardly flared cutting edge, 141. The outer face, 142, of the cutting edge is then tapered to provide the necessary clearance. A segment of the disk is then removed along a line, 143, somewhat to one side of the center, and the disk cut away at each end of this line, as shown in Figs. 24 and 25, so that the ends of the cutting edge lie in surfaces at right angles to one another. A pair of cutters is then inserted in slots, 137, 138, with their cutting edges faced toward one another and with the line, 143, against the base of the slot and the ends, 144, 145, of the cutting edge against the side and bottom of the holder; the holder and each cutter are drilled and the holder threaded so that the cutters may be held tightly in this position by screws, 146.

If the forming of the cutters has been correctly done the cutting edges of the two cutters will now lie in one and the same central plane of the holder.

My improved cutter may be driven at a very high rate of speed. The individual cutter disks are easily and quickly removed for grinding and new cutters may be as readily substituted for the old. As only square and round stock is required for the making of the cutter and as the manufacturing operations are simple, it is obvious that the cutter as a whole is comparatively inexpensive.

As above described, the balancing cylinder, 86, compensates for a certain determined percentage of the weight of the tracer and cutter frame. The exact percentages, as has been explained, will be dependent upon the air pressure used and upon the adjustment of the pressure reducing valve, 100. The balancing cylinder is, therefore, functionally, the equivalent of a plain counterbalance of the usual type.

Under certain conditions, however, and particularly where the pattern to be followed involves sharp upward and downward curves (convexities or concavities) it is desirable, not only to counterbalance the tracer and cutter frame, but also to eliminate, so far as possible, the inertia of this frame. This can, obviously, not be done by any usual gravity or spring counterbalance. It is, however, a simple matter to accomplish this with the aid of my invention. To do it, I combine with the balancing cylinder, as previously described, a valve automatically controlled by the pressure of the tracer upon the pattern. This valve is so arranged and may be so adjusted that it will, for example, if in the execution of the work the tracer reaches a portion of the pattern which curves sharply upward, cause an increase of air pressure below the piston of the balancing cylinder which will automatically lift the tracer and cutter frame until normal conditions are again restored; i. e., until the portion of the pattern engaged by the tracer again becomes substantially horizontal. Or the valve may be so adjusted that, in case the tracer encounters a part of the pattern which curves sharply downward, the air pressure beneath the piston will be reduced so as to allow the tracer and cutter frame to promptly follow the downward curve. In this case, as before, as soon as that portion of the pattern over which the tracer moves again becomes substantially horizontal, the air pressure beneath the piston will again become normal and the device act as a plain counterbalance.

More specifically, the modified counterbalance arrangement comprises a tracer head, 147, fixed in the lower end of a revoluble spindle, 148, to which is attached the tracer driving pulley, 76. This spindle is mounted in a housing, 149, attached to the tracer and cutter frame and is provided with ball bearings, including thrust bearings, of the usual type. Pulley, 76, is independently mounted upon the tracer and cutter frame and so that its plane of motion is fixed with respect to said frame while the tracer spindle, 148, has a limited amount of up and down play in this pulley and also in its housing.

Mounted immediately above the spindle, 148, is a valve actuating pin, 150, provided with a shoulder, 151, near its lower extremity. A spring, 152, has its lower end resting upon this shoulder and its upper end engaged with an adjustable nut, 152', and is always pressed against the tracer spindle, 148, with a degree of pressure determined by the adjustment of the nut, 152'.

Immediately above and resting upon the pin, 150, is a double headed piston valve, 153. This piston is vertically slidable in a cylinder, 154, open at its upper end. This cylinder is itself fixed in a supporting member, 155, which is slidably engaged with a bracket, 156, itself bolted to the top of the tracer and cutter frame; and adjusting screw, 157, is used to set and hold the supporting member at the desired height.

Cylinder, 154, is divided in its upper half so as to provide a very narrow slot, or port, 158, opening into an exterior annular recess, 159, with which is connected an air pipe, 160. The other end of this air pipe is connected at 161 with the air pressure line 98.

The improved automatic balancing device may be used in either of two ways; for the first method of use the tension of the spring 152 and the position of the supporting member 155 are so adjusted that when cutting horizontally the tracer spindle is in its uppermost position relative to the cutter frame and the valve port 158 is closed by reason of the weight of the tracer and cutter frame which is carried by the tracer as it rests upon the pattern. Such adjustment of the air pressure and valves is made that a predetermined pressure will normally be maintained in the balancing cylinder but upon the opening of the valve port 158, such pressure will be substantially reduced. When the upward pressure upon the tracer is relieved during operation, as for example, when the contour of the pattern over which the tracer is moving turns suddenly downward, the tracer will move downward relative to the cutter frame under the action of spring 152 and the valve port 158 will be opened. The pressure in the balancing cylinder being thus relieved, its supporting effect upon the cutter frame will be immediately reduced. In the second manner of use of the automatic device, the tension of the spring 152 and the position of the supporting member 155 are so adjusted that the spindle is maintained during normal operation in its lowermost position and the valve port 158 is open, permitting a constant leakage through such port. The valves and fluid pressure are so adjusted that a predetermined pressure will be normally maintained in the balancing cylinder in spite of the constant escape of air. When the pressure upon the tracer is increased sufficiently (as, for example, when the contour of the pattern over which the tracer arm is passing turns suddenly upward), the tracer spindle will move upwardly closing the valve port 158 and the air pressure in the balancing cylinder will accordingly be increased, thus increasing the lifting effect upon the cutter frame 54.

In each method of operation, an automatic variation of the lifting effect of the balancing cylinder is attained and accordingly the device acts to automatically overcome the inertia of the cutter frame. Which method of adjustment and operation should be adopted, will depend upon the particular work being done and material being operated upon.

An adjusting valve, 162, is inserted in the air pipe line, 98, between the pressure reducing valve, 100, and the pipe connections which lead respectively to the balancing cylinders and to the control valve.

In the actual use of my improved automatic control device as just described, let it be supposed that the supporting member, 155, has been positioned by the adjusting screw, 157, as shown in Figs. 26 and 27. In such case, when the tracer is resting upon the pattern, the tracer head, 147, and tracer spindle, 148, will be pushed upwardly to their upper limit if the spring, 152, has been suitably adjusted. With the tracer spindle thus in its upper position the upper surface of piston valve, 153, will lie just even with the upper edge of port, 158, thereby closing the port. By suitably adjusting the main air pressure, and the valves, 100, and 162, a resultant pressure under the piston of the balancing cylinder, 86, will be maintained sufficient to sustain that percentage of the weight of the tracer and cutter frame which has been deemed best. Suppose now, that in in the operation of the machine a portion of the pattern having a sharp downward curve is moved under the tracer. The tracer will be, instantaneously, left unsupported and the tracer and cutter frame will tend to drop. Owing to the inertia of the frame, however, the tracer spindle, 148, will be pushed to its lower limit by spring, 152, before the tracer and cutter frame has started to fall. This will cause the upper head of the piston valve, 153, to drop and uncover port, 158, thereby opening the valve and allowing air leakage, thus causing an immediate fall of air pressure under the piston in the bottom of the balancing cylinder. This reduction of air pressure allows the tracer and cutter frame to fall more rapidly than it otherwise would and therefore follow the model along the downward curve.

By sufficiently compressing spring, 152, the tracer spindle, 148, may be conditioned so that it will lie in its lowermost position under all conditions of normal running, that is, when the portion of the pattern being engaged by the tracer is substantially horizontal. In such case the upper head of piston valve, 153, will lie below port, 158. If now, a sharp downward curve of the pattern is suddenly encountered by the tracer, the tracer and cutter frame will follow this curve just as if the control valve was absent, since the leakage of air through pipe, 160, will remain unchanged. If, however, the tracer encounters a portion of the pattern which curves sharply upward the inertia of the tracer and cutter frame will cause the tracer spindle to be immediately raised to its upper limit thereby closing port, 158, increasing the air pressure below the piston in the balancing cylinder, and hence, lifting the tracer and cutter frame in order to surmount the upward curve.

My invention may be readily arranged to give still greater speed of production by using two tracer and cutter frames at the same time upon the same pattern and pair of propeller blanks. In such case the said two frames should have their edges carrying the tracer and cutters arranged adjacent to one another and at a distance apart as short as possible, while their longer pivotally supported edges would be remote from one another; i. e., in plan view the two frames would be mutually reversed. The table carrying the pattern and blanks would be moved under the frames, as before, reversing as already described when the end of the pattern passes under the tracer at this end of the machine; both tracer and pattern frames should be connected up so as to shift transversely as one at each reversal of the table, but in opposite directions. With this arrangement the cutter of the two frames will respectively cut from opposite sides to the longitudinal center line of the blank or vice versa.

Some articles of large size and very considerable length as compared with their other dimensions can be more readily and rapidly worked out, perhaps, by a combination of continuous longitudinal strokes and intermittent rotary feeds than by longitudinal strokes and intermittent transverse feeds. Such articles are, for example, posts, struts, and others having circular, elliptical, oval or similar sections whose contours do not change too abruptly. My invention can easily be modified to operate in this way and I illustrate such a modified machine in Figs. 30 to 33.

In this form of the invention the pattern, 164, and the blanks, 165, are not clamped to the table 4, but are held between pairs of dead centers, 166, and live centers, 167, which are supported upon the table. The dead centers are longitudinally adjustable for different lengths of work after the manner of lathe construction. Each live center, 167, is provided with a worm gear, 168, and a transverse worm, 169, rotatable in suitable bearings fixed to the table, meshes with each gear and hence is adapted to rotate the pattern and the work blanks simultaneously through equal angles.

Worm, 169, has a ratchet gear, 170, fixed upon one end and adapted to be engaged by a pawl, 171, pivoted upon a lever, 172; the outer end of this lever is pivotally connected with one end of a link, 173, whose other end is similarly pivoted upon a lug constituting part of a ratchet actuating device, 174, similar to the ratchet actuating device previously described as used for intermittently shifting or feeding the tracer and cutter frame across the track. Ratchet actuating device, 174, is fixed upon the end of an axle to which is fixed one of the wheels, 6, of the table, 4.

No change need be made with respect to any other portions of the machine except to throw off the dog through which feed screw, 58, is driven to advance the tracer and cutter frame across the track; and to preferably, lock the bearings, 55, by suitable clamp screws, 175, or the equivalent, against any accidental movement after the machine has been started up and its regular operation has begun.

In operation, each reversal of the table causes the actuating device, 174, to rotate the worm gear, 169, and, hence, the live centers, 167, through a predetermined angle. Pattern and work blanks are, therefore, intermittently but similarly rotated after each longitudinal movement of the table, and, during such movement, the cutters remove material from the work along a longitudinal contour line corresponding exactly with a similar line of the pattern.

Various changes of detail and in the arrangement of parts may be made within the spirit of the invention and scope of the following—

Claims:

1. In a machine of the class described, a tracer and cutter frame having a pivotal axis, a tracer and cutter held in said frame, a track at right angles to said axis, a table for the pattern and work movable upon said track, supporting means for said axis entirely outside the path of the table, driving means for regularly moving the table to and fro upon the track adjacent to the tracer and cutter, mechanism for automatically and similarly moving the surfaces of the pattern and work past the tracer and cutter at the end of each to or fro movement of the table and in a direction parallel to the aforesaid pivotal axis, and manually controlled clutch means for connecting or disconnecting the driving means from the table.

2. In a machine of the class described, a linearly movable table for the pattern and work, a tracer and cutter frame movable transversely to the line of movement of the table, a counterbalance connected to said tracer and cutter frame, and means for intermittently and simultaneously moving the tracer and cutter frame and also the counterbalance, substantially as described.

3. In a machine of the class described, a linearly movable table for the pattern and work, a tracer and cutter frame having a pivotal axis transverse to the line of movement of the table, a counterbalance connected with but mounted independently of said tracer and cutter frame, and means controlled by the movement of the table for intermittently moving the tracer and cutter frame in the line of its axis and simultaneously and positively moving the counterbalance in a direction parallel with said axis.

4. In a machine of the class described, a tracer and cutter frame supported upon a pivotal axis, the frame being unbalanced with respect to said axis, a tracer and cutter attached to said frame and adapted to press upon pattern and work with the unbalanced weight of the frame, a balancing device between the frame and a fixed outside support, said device comprising a piston and cylinder connected to fixed support and frame respectively and connected with a source of compressed air so as to exert a greater or less lifting effect upon the frame according as the air pressure is greater or less, and a valve controlled by the pressure upon the tracer to vary said air pressure.

5. In a machine of the class described, a tracer and cutter frame supported upon a pivotal axis, the frame being unbalanced with respect to said axis, a tracer and cutter attached to said frame and adapted to press upon pattern and work with the unbalanced weight of the frame, the tracer being axially slidable, a balancing device between the frame and a fixed outside support, said device comprising a piston and cylinder connected to fixed support and frame respectively and connected with a source of compressed air so as to exert a greater or less lifting effect upon the frame according as the air pressure is greater or less, a valve engaged with the slidable tracer so as to move therewith and to increase or decrease the pressure of the air supply according to its direction of movement, and an adjustable spring for varying the pressure between the frame and the slidable tracer.

6. A machine for reproducing propellers and the like from a pattern, said machine comprising a work and pattern support relatively movable past a cutter and tracer, a tracer and cutter frame, and means for overcoming the inertia of the tracer and cutter frame.

7. A machine for reproducing propellers and the like from a pattern, said machine comprising a work and pattern support relatively movable past a cutter and tracer, a tracer and cutter frame, and means for automatically varying the pressure upon the cutter in correspondence with the variations in pressure on the tracer.

In testimony whereof I have hereunto set my hand.

JOSEPH F. KELLER.